United States Patent [19]

Slaats et al.

[11] 3,970,732
[45] July 20, 1976

[54] METHOD OF MOLDING RIGID FOAMED POLYURETHANE ARTICLES

[75] Inventors: Mathew A. Slaats; David E. Overton, both of Jasper, Ind.

[73] Assignee: Kimball International, Inc., Jasper, Ind.

[22] Filed: Sept. 26, 1973

[21] Appl. No.: 401,114

[52] U.S. Cl. ............................ 264/40.5; 264/53; 264/101; 425/812; 425/817 R
[51] Int. Cl.² .................................. B29D 27/00
[58] Field of Search ............ 264/45, 51, 54, 334, 264/335, 102, 50, 101; 425/812, 817

[56] References Cited
UNITED STATES PATENTS

| | | | |
|---|---|---|---|
| 2,140,063 | 12/1938 | Talalay | 264/50 X |
| 2,354,433 | 7/1944 | Carter | 264/50 |
| 2,753,642 | 7/1956 | Sullivan | 264/54 X |
| 3,122,785 | 3/1964 | Weinbrenner et al. | 264/54 X |
| 3,124,627 | 3/1964 | Hood | 264/54 |
| 3,162,703 | 12/1964 | Eyles | 264/51 |
| 3,327,029 | 6/1967 | Pincus et al. | 264/45 |
| 3,347,966 | 10/1967 | Seefluth | 264/335 X |
| 3,389,198 | 6/1968 | Taber | 264/54 X |
| 3,431,331 | 3/1969 | Pincus et al. | 264/45 |
| 3,745,203 | 7/1973 | Harper | 264/48 |
| 3,803,281 | 4/1974 | Fix | 264/102 |

FOREIGN PATENTS OR APPLICATIONS

| | | | |
|---|---|---|---|
| 532,697 | 11/1956 | Canada | 264/54 |
| 958,429 | 2/1957 | Germany | 264/101 |
| 962,595 | 4/1957 | Germany | 264/101 |
| 274,039 | 3/1951 | Switzerland | 264/101 |
| 1,008,136 | 10/1965 | United Kingdom | 264/101 |
| 812,844 | 5/1959 | United Kingdom | 264/54 |

OTHER PUBLICATIONS

Margedant, J. A. "Freon" – Blown Rigid Foams, DuPont Bulletins HR-31, July 1958, Wilmington, Del., E. I. DuPont de Nemours & Co., Inc., pp. 1–5.
Ferrigno, T. H., "Rigid Plastics Foams", New York, Reinhold, 1963, pp. 42–45; 51–68.
Bender, Rene J., "Handbook of Foamed Plastics", Libertyville, Ill., Lake Publishing Corp., 1965, pp. 137, 138, 163–166.
"The Rolling Showcase for Engineering Plastics", (Mobay Bulletin) Pittsburgh, Pa., Mobay Chemical Co., (1968), 8 pp.

*Primary Examiner*—Philip Anderson
*Attorney, Agent, or Firm*—Melvin A. Crosby

[57] ABSTRACT

A method and apparatus for molding plastic materials, particularly foamed plastic materials, in which the materials are introduced into a mold cavity together with a foaming agent with the mold cavity being evacuated not later than immediately after the molding material is supplied thereto. The reduced pressure in the mold cavity causes the material to foam extremely quickly so as completely to fill the cavity while, at the same time, the mold is held closed by the pressure differential between the inside and outside thereof.

6 Claims, 9 Drawing Figures

METHOD OF MOLDING RIGID FOAMED POLYURETHANE ARTICLES

The present invention relates to a method for molding plastic material, especially foamed plastic material.

The making of articles from foamed plastic material is well known and is usually accomplished by foaming the material within a mold cavity which defines the shape of the article being made. Sometimes, heat is applied to the mold cavity in order to cause the foaming agent to bring about foaming of the materials and to cure the materials.

Heretofore, difficulty has sometimes been encountered in completely filling a mold cavity and in producing workpieces which are uniform in density throughout. This is especially true when the shape of the article being molded requires the plastic material to flow along a long path, particularly an upwardly extending path.

The material is sometimes injected into a mold cavity under pressure, and this requires the use of a press having clamping devices to hold the mold parts closed during the molding operation. Further, the possibility is present that gas entrapped in the mold cavity will prevent the workpiece from being molded to true shape.

With the foregoing in mind, a particular object of the present invention is the provision of a method for molding foamed plastic material which avoids the difficulties and drawbacks above referred to and which requires the minimum in apparatus.

Another object is the provision of a method for making foamed plastic articles in which the articles produced are extremely uniform in density throughout.

It is also an object of the invention to provide a method for producing foamed plastic articles in which substantially any configuration of article can be formed.

It is also an object of the invention to provide a method for producing foamed plastic articles in which the articles are extremely stable as to size and shape upon removal thereof from the mold cavity.

Still another object of the invention is the provision of a method for producing foamed plastic articles in which the molding procedure is extremely rapid and, therefore, economical to practice.

BRIEF SUMMARY OF THE INVENTION

According to the present invention, the materials required for creating a foamed plastic article are introduced into a mold cavity which is evacuated immediately prior to or immediately after the introduction of the material into the cavity. The reduced pressure in the cavity causes the material to foam substantially instantaneously whereby the foamed material will flow quickly to all parts of the cavity and be quite uniform in density.

The mold defining the mold cavity is provided with a gap about the joint line, and a suction connection is made to the gap. Outwardly from the suction connection the mold parts are sealed to each other whereby, upon the application of suction in the suction connection, the differential pressure established between the inside and the outside of the mold will keep the mold parts clamped together without requiring additional mechanical clamping devices.

A number of plastic materials can be molded in this manner, including polyurethane, polyester, epoxy resins and alkyd resins and, by way of example, there is described in detail herein a molding procedure in which isocyanate and polyol together with a catalyzer and surfactant and a blowing agent such as Freon is ejected in liquid form into the mold cavity and within which mold cavity the polyol and isocyanate react while the blowing agent expands with the bubble size created thereby being controlled by the surfactant thereby to form a foamed plastic article within the mold cavity.

The mold cavity can be lined with a suitable release agent or member, and it is contemplated to line at least one part of the cavity with a flexible member of elastomeric material compatible with the material being molded and which elastomeric material may be subjected to pressure from the side opposite the mold cavity and thereby effect ejection of the mold article from the mold cavity.

The materials referred to react quickly and are supplied from respective supplies to the mold cavity in measured quantities which can be determined by pressurizing the materials and controlling the time that a valve is open through which the respective material flows into the mold cavity. Mixing of the materials is important to obtain uniform quality and with this in mind, the materials which are to react with each other are preferably introduced into the mold cavity along a mixing channel which effects intimate mixing of the materials flowing therealong so that the materials reach the mold cavity in intimately admixed condition.

The catalyst can be mixed with one of the polyol or isocyanate or it can be introduced into the mold cavity independently. Similarly with the surfactant and the blowing agent.

The exact nature of the present invention will become more apparent upon reference to the following detailed specification taken in connection with the accompanying drawings in which.

DETAILED DESCRIPTION OF THE INVENTION

Figure 1:
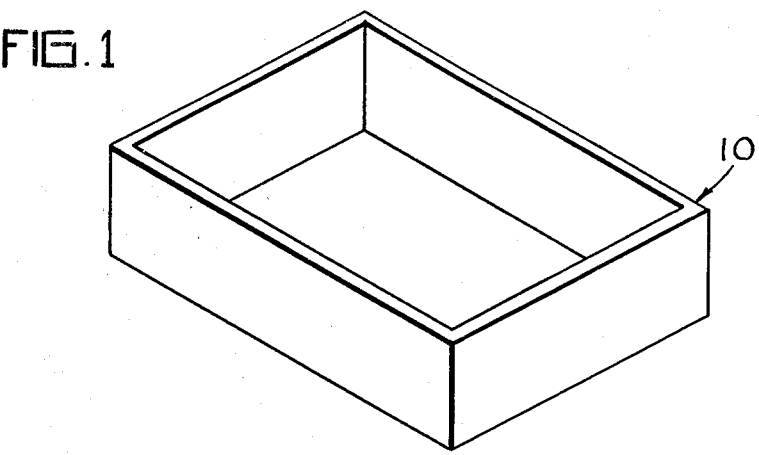
FIG. 1 is a perspective view showing a typical work member adapted for being molded in accordance with the principles of the present invention.
Figure 2:
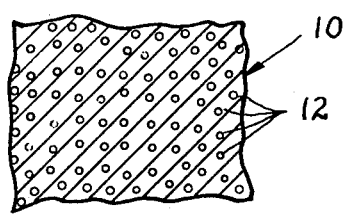
FIG. 2 is a fragmentary view showing a piece of the material of the article of FIG. 1 and showing the uniformity of the distribution of the gas bubbles therein.

Referring to the drawings somewhat more in detail, a molded article is indicated at 10 in FIG. 1. This article may comprise a box-like member adapted to form, for example, the body of a drawer or a cabinet. The member is shown open at the top and can be open on one of the ends or one of the sides but may also be molded as a five sided article as illustrated. FIG. 2 is a fragmentary view showing a portion of a wall of article 10 and indicating the even size and distribution therein of bubbles 12 that are formed by the blowing agent which causes expansion of the molding material in the mold.

Figure 3:
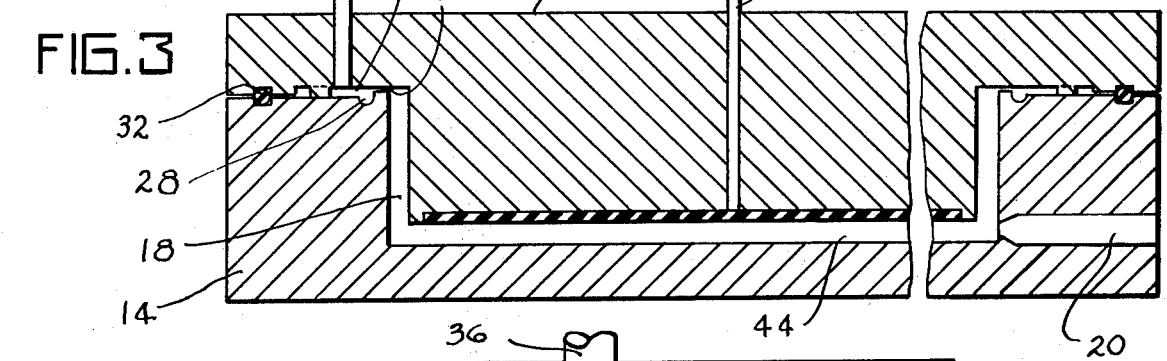
FIG. 3 is a longitudinal section through a typical mold in which the article of FIG. 1 is adapted to be molded.

FIG. 3 somewhat schematically illustrates a typical mold. The mold consists of a bottom part 14 and an upper part 16 and confined by parts 14 and 16 when in assembled relation is mold cavity 18 in which the article to be molded is to be made. The molding material may be introduced into the cavity in any suitable means, as by pouring it into the mold cavity before the parts 14 and 16 are brought together but, advantageously, the material is injected into the mold cavity as by a passage 20.

A feature of the present invention is to be found in the fact that the upper edge of cavity 10 communicates with a gap 22 defined between the opposed parts 14 and 16 and, preferably, extending completely around the mold cavity. This gap may be disposed entirely on the outside of the cavity or it may include a gap portion extending around the inside of the cavity and communicating with gap 22.

The gap 22 may be held to small dimension, or the gap may be restricted adjacent the mold cavity, as indicated at 23 to a valve which, typically, is about 0.002 inches. The narrow gap forms a stop for the molding material so the material does not normally flow into the gap but stops at the juncture of the gap with the mold cavity.

Adjacent the point gap 22 communicates with the cavity there is formed a small recess 28 which prevents any molding material which flashes out through the gap from progressing any further than the recess 28.

Outwardly from recess 28 the mold parts are sealed together as by a resilient annular seal ring 32.

Figure 4:
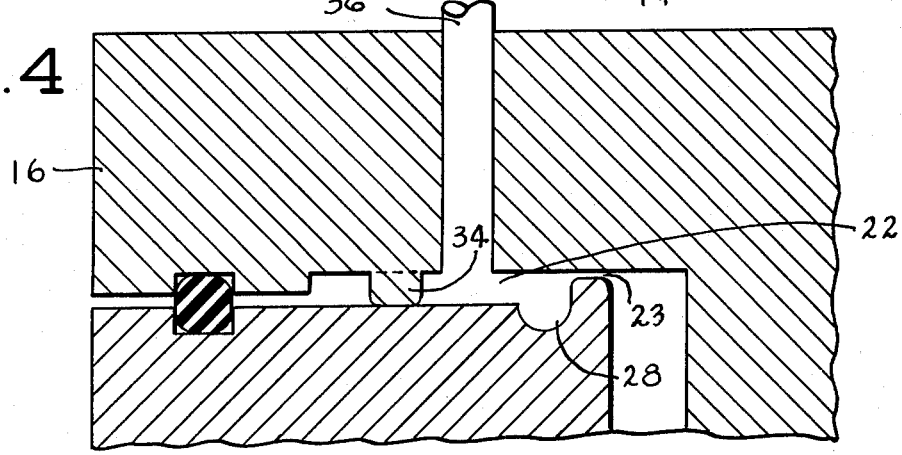
FIG. 4 is a fragmentary sectional view showing one corner of the mold of FIG. 3 at considerably enlarged scale.
Figure 5:
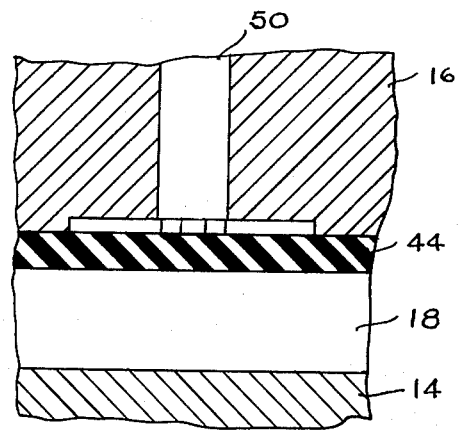
FIG. 5 is a fragmentary view showing a part of a mold structure which has a flexible liner therein and which can be caused to flex by a supply of pressure fluid thereto to eject the article from the cavity.

As will be seen in FIG. 4, the spacing of mold parts 16 and 14 may be under the control of protrusions 34 formed on one or both of the parts and engaging the other thereof when the mold is in closed condition.

Inwardly from seal 38 there is connected to the gap a suction conduit 36 leading to a source of suction 38 via a coupling 40. Conduit 36 may also have a control valve 42 disposed therein to control the application of suction to the gap and therethrough to the mold cavity.

Advantageously, the mold parts are coated with a release agent or may be lined with an elastomeric material as indicated at 44 for upper mold part 16.

The elastomeric liner 44 in upper mold part 16 may be employed for the ejection of workpieces and this might be accomplished, for example, by providing a conduit 50 leading to the rear side of liner 44 and adapted for receiving pressure via a valve 52 or for being connected to a source of suction via valve 54. When pressure is supplied to conduit 50 liner 44 will be pushed outwardly and in this manner a workpiece molded in the mold cavity will be ejected from mold part 16. Lower mold part 14 may be separable in about the plane of the bottom wall thereof for convenience of manufacture.

Figure 9:
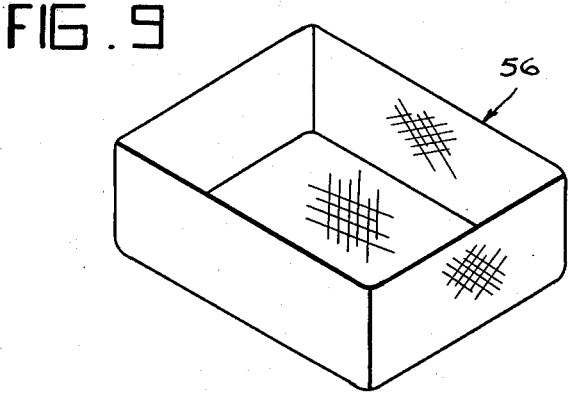
FIG. 9 shows a reinforcing member adapted to be inserted in a mold cavity prior to the closing of a mold to reinforce the article molded therein.

The molded part may consist of plastic material but it is also possible to reinforce the molded article by placing reinforcing means in the mold cavity prior to the molding operation. Such a reinforcing means might take the form of the article shown in FIG. 9 which may, for example, be a loosely woven preformed glass fiber member or the like. The member 56 of FIG. 9 is placed loosely in the mold cavity before the mold parts are closed and when the plastic material is expanded in the mold cavity will encapsulate member 56 and member 56 will, in this manner, provide reinforcing for the molded article.

Figure 6:
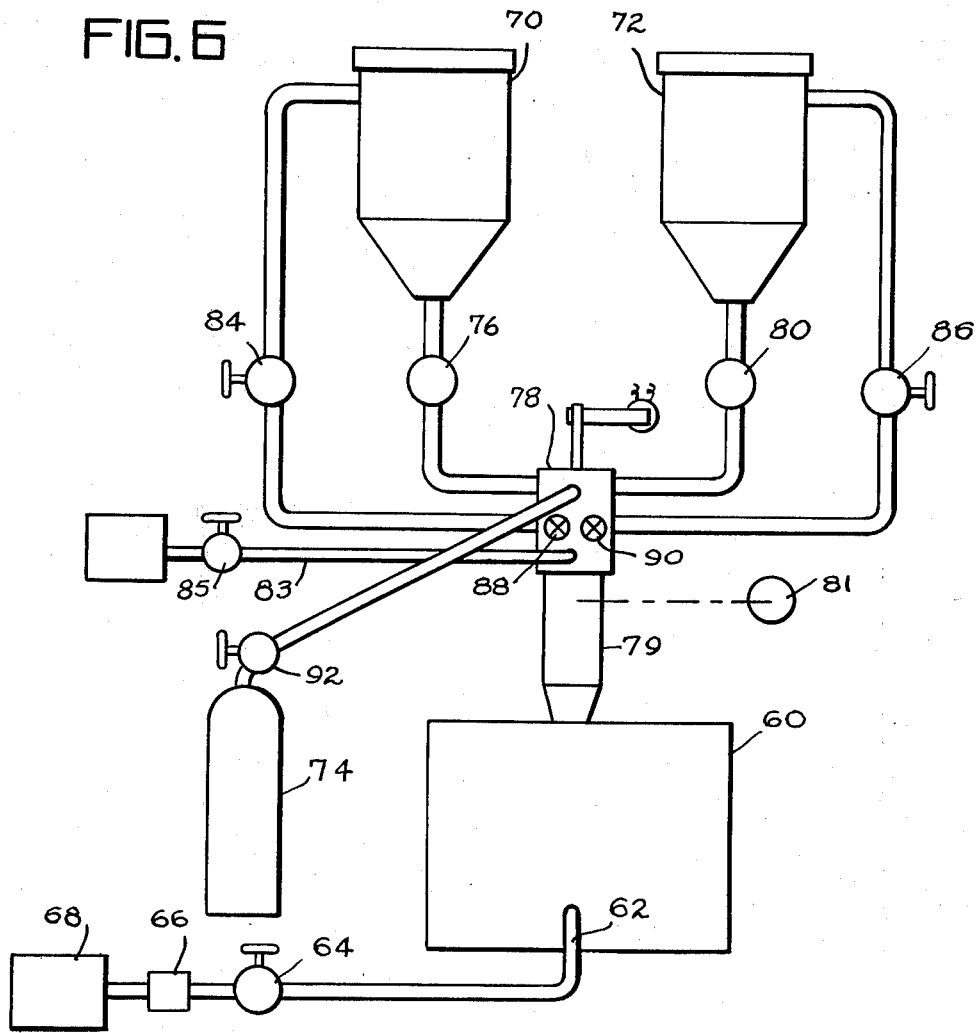
FIG. 6 is a schematic view showing a typical molding arrangement for supplying molding material to a mold cavity.

FIG. 6 schematically illustrates one manner in which the molding operation can be carried out. In FIG. 6, reference numeral 60 represents a mold of the type that has been described above. A suction connection 62 is connected to the mold cavity in the described manner and leads through a valve 64 and a coupling 66 to a source of suction at 68.

A container 70 is provided which may contain polyol which may be mixed with the catalyzer which is to catalyze the reaction of the polyol with the isocyanate. Another container 72 contains the isocyanate and this may, or may not, be mixed with the surfactant which is supplied to control the size of the bubbles.

A third container 74 contains the blowing agent which may, for example, be Freon in liquid form. The Freon may also be admixed in measured amount with the material in one or the other, or both, of the containers 70, 72.

Container 70 is connected through a pump 76 with a control valve 78 and container 72 is similarly connected through a pump 80 with the said control valve. The control valve controls the connection of the discharge sides of pumps 76 and 80 with the mixing chamber 79 leading into the mold cavity. The valve 78 may be operated between the two effective positions thereof by a solenoid arrangement according to a timed cycle.

When the discharge sides of pumps 76 and 80 are disconnected from chamber 79, the discharges therefrom are directed through respective valves 84 and 86 back to the respective containers 70, 72. Valves 84 and 86 are employed to maintain the proper pressures at the discharge sides of pumps 76 and 80.

Valve 78 also controls the connection of Freon tank 74 to valve 78 when the Freon is supplied from a separate source. Respective valves 88, 90 and 92, or metering orifices, are provided for controlling the supplies of polyol, isocyanate and Freon to the mold cavity when control valve 78 is actuated so that accurately proportioned total charges of each are supplied to the mold cavity.

Valve 78, downstream from the points of supply of the plastic material, may include a mixing chamber 79 which may have an agitator therein driven by motor 81. Further, a source of cleaning solvent, methyl chloride in the case of the plastic material referred to, is maintained under pressure and is connected to the upstream end of chamber 79 by a conduit 83 in which is a valve 85. After an injection cycle, and the mold has been disconnected from the mixing chamber, the mixing chamber is cleaned by flushing it out with solvent.

In operation, once the the mold is closed, the molding material may be supplied to the mold cavity and the mold cavity immediately evacuated by opening valve 64 or, alternatively, the mold may be closed and then evacuated by opening valve 64 and then the molding material supplied thereto. In either case, the molding material supplied thereto mixes, or is mixed, while it is being supplied to the mold cavity and will foam immediately therein due to the reduced pressure in the mold cavity.

The rapidity of foaming of the material insures that it will completely fill the mold cavity and will do so before the material commences to cure. Furthermore, the rapid foaming of the material assists in insuring that the principal components of the molding material are completely and intimately admixed.

The result is that a workpiece or article can be formed extremely rapidly and will completely fill the mold cavity without voids while the density of the molded article will be extremely uniform and, furthermore, can readily be controlled by the amount of molding material introduced into the cavity.

An important result of forming a foamed article according to the present invention is that the gas bubbles therein are at low pressure so that the article will not tend to deform or warp if it becomes softened by heat or for any other reason.

The subatmospheric pressure existing in at least the gap between the parts of the mold cavity insures that the mold will be held closed by atmospheric pressure standing on the outside thereof. At the end of the molding operation, and the following dwell period, which may be about ten minutes, there may be even some slight pressure built up on the molding material in the molding cavity but this will be relatively small and not sufficient to force the mold parts away from each other so long as the gap surrounding the mold cavity is maintained at subatmospheric pressure.

It has been found that the molding material does not flow out into the gap in a substantial amount so that the workpieces are formed with substantially no flash thereon or, at the most, a very small amount of flash that can readily be removed from the article after it is completely cured.

The plastic material may cure completely within the mold or, if necessary, a small amount of heat can be supplied thereto to effect complete curing of the article.

Figure 7:
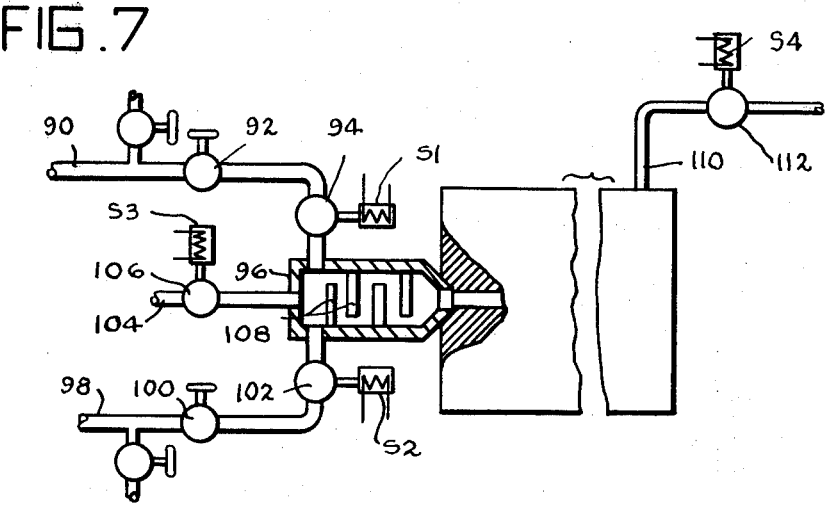
FIG. 7 is a schematic detail showing the functional arrangement of valves and a mixing channel for material supplied to a mold cavity.

One way of controlling the supply of material to the mold cavity is illustrated in FIG. 7 wherein a first conduit 90 leading from one of the polyol and isocyanate containers, is connected through a control valve 92 and a normally closed solenoid operated valve 94 with a fitting 96 that communicates with the mold cavity. Similarly, a conduit 98 leading from the other of the said supplies is connected through a control valve 100 and a normally closed solenoid operated valve 102 with fitting 96.

Also, a conduit 104 leading from the blowing agent, when the blowing agent is derived from a separate source, is connected through a normally closed solenoid operated valve 106 with fitting 96. Fitting 96 is a static mixer which replaces mixing chamber 79 of FIG. 6 and is in the form of a chamber having blades or like mixing elements 108 therein which agitate the material flowing through the fitting so that when the material emerges into the mold cavity it will be thoroughly admixed. Fitting 96 can be flushed clean after each molding cycle by a suitable solvent or the fitting may be formed cheaply, as from a plastic material and discarded at the end of the molding operation.

In the arrangement of FIG. 7, the suction conduit 110 leading to the mold cavity has a normally closed solenoid operated valve 112 therein.

Figure 8:
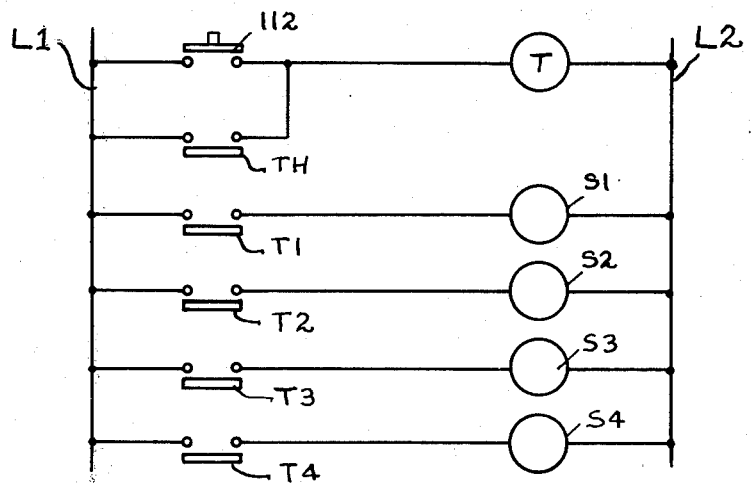
FIG. 8 is a schematic representation of an electric control circuit that could be employed with the FIG. 7 arrangement.

FIG. 8 shows a circuit comprised of power lines L1 and L2 and adapted for controlling the solenoids of the valves above referred to in FIG. 7 according to a timed cycle thereby to provide for the proper amount of each of the materials to be supplied to the mold cavity on each cycle.

In FIG. 8, a timer T is connected to be energized by closing of a switch 112 and includes a blade TH parallel with switch 112 and which blade provides a holding circuit for the timer.

The timer also has a blade T1 in circuit with solenoid S1 for valve 94 and blade T2 in circuit with solenoid S2 of valve 102 blade T3 in circuit with solenoid S3 of valve 106 and a blade T4 in circuit with solenoid S4 of valve 110. When switch 112 is closed to energize the timer, the blades close according to a predetermined sequence and open according to a predetermined sequence thereby providing for the timed control of the supply of material to the mold cavity. Normally, all of the blades of the timer would close at one time and blades T1, T2 and T3 would then open in conformity with the particular amount of material to be controlled thereby and, finally, after the article had foamed in the mold cavity and was at least partially set therein, blade T4 would open and relieve the suction.

Normally, flow control valves 92 and 100 would be so adjusted that the pertaining solenoids operating valves 94 and 102 could remain open for the same length of time thereby simplifying the matter of control of the supply of material to the molding cavity. The function of valves 92, 94 and 100, 102 could be reversed to correspond with the corresponding valves of FIG. 6. Further, as with the valves of FIG. 6, a single solenoid could control a single valve having multiple passages therein for the different components injected into the mold cavity with the flow in each valve passage under the control of an adjustable valve. In such a case, only a single timed period for a single solenoid is required.

Still further, the valves controlling the flow of the materials into the mold cavity, such as valves 94, 102 and 106, could be in the form of separate valves mechanically interconnected for operation in unison between open and closed positions.

The flushing of the mixing chamber, when this is done could easily be automated, as well as the closing and opening of the molds and the ejection of the workpiece therefrom and the moving of the molds into and out of working position.

It will be apparent that a great many different types of workpieces can be molded according to the present invention and that a great many different materials can be employed in the molding process. The particular molding material is not the essential feature of the present invention but, rather, the essential feature is the substantially immediate foaming of the material introduced into the mold cavity due to evacuation of the mold cavity while, simultaneously, the reduced pressure in the mold cavity will maintain the mold parts defining the mold cavity in closed condition throughout the molding operation and until the molded article has set up within the mold cavity.

Modifications may be made within the scope of the appended claims.

What is claimed is:

1. The method of making rigid articles of polyurethane foam in which a mixture of a polyol and isocyanate and a blowing agent is supplied to and foamed within a mold which includes separable parts defining a mold cavity therebetween when closed which comprises: injecting the polyol and isocyanate and blowing agent in admixed form to the mold cavity, and applying suction to the cavity via a restricted slit-like gap extending about the periphery of the cavity at the juncture of the mold parts not later than immediately following the injection of the aforementioned mixture into the cavity to cause extremely rapid foaming of the said admixture with expansion and flow thereof to fill the cavity without significant flashing through said gap, admixing said polyol and isocyanate not sooner than immediately prior to the injection thereof to the mold cavity and immediately adjacent the point of entry of the mixture into the cavity, said method furthermore including admixing a liquid blowing agent with at least one of said polyol and isocyanate not later than time of admixing the polyol with the isocyanate.

2. The method according to claim 1 in which the method includes admixing a catalyst with at least one of said polyol and isocyanate to catalyze the reaction therebetween.

3. The method according to claim 1 in which the method includes admixing a surfactant with at least one of said polyol and isocyanate to control the bubble size of the bubbles created in the foamed material by the blowing agent.

4. The method according to claim 1 in which said polyol and isocyanate are admixed simultaneously with the movement thereof from the respective supplies thereof into the mold cavity.

5. The method according to claim 1 in which the mold cavity is defined by interengaged mold parts, and the mold parts are clamped together solely by atmospheric pressure when suction is applied to the mold cavity.

6. The method according to claim 1 in which said mold cavity provides a long flow path and is defined by abuttingly interengaged mold parts having a restricted slit-like gap extending about the periphery of said cavity at the juncture of said mold parts; said gap having a recess adjacent said mold cavity and sealing means outward of said recess, said method including applying said suction to the space defined by said gap at a location between said recess and said seal whereby the mold parts are clamped together solely by atmospheric pressure.

* * * * *